Nov. 18, 1958 P. SCHMIDT 2,860,484
APPARATUS FOR CAUSING INTERMITTENT COMBUSTION OF A FUEL
IN A CHAMBER AS A MEANS OF PRODUCING USEFUL ENERGY
Filed June 4, 1956 3 Sheets-Sheet 1

Inventor:
P. Schmidt

Nov. 18, 1958 P. SCHMIDT 2,860,484
APPARATUS FOR CAUSING INTERMITTENT COMBUSTION OF A FUEL
IN A CHAMBER AS A MEANS OF PRODUCING USEFUL ENERGY
Filed June 4, 1956 3 Sheets-Sheet 2
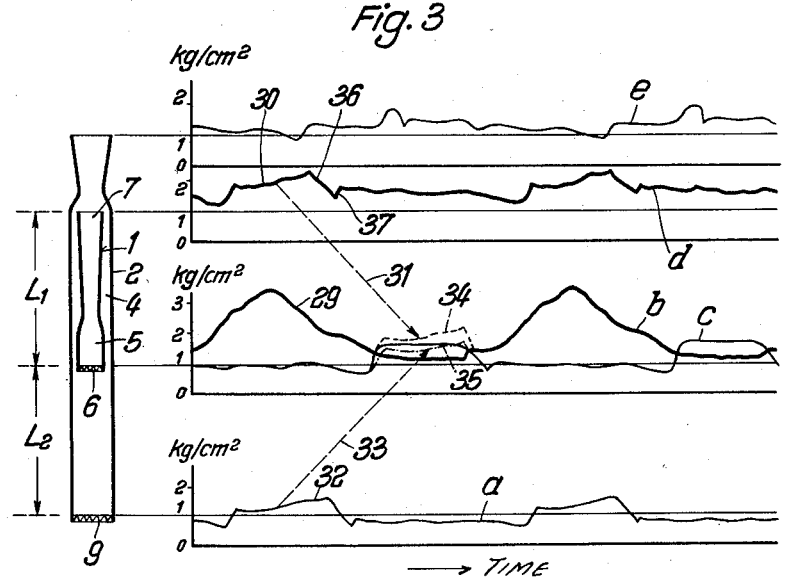
Fig. 3
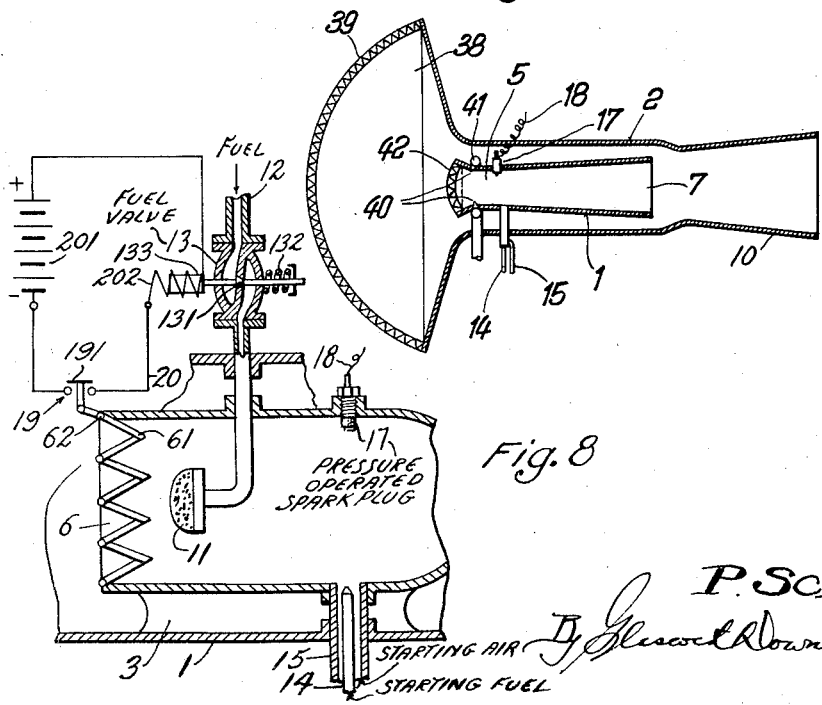
Fig. 4
Fig. 8
Inventor:
P. Schmidt

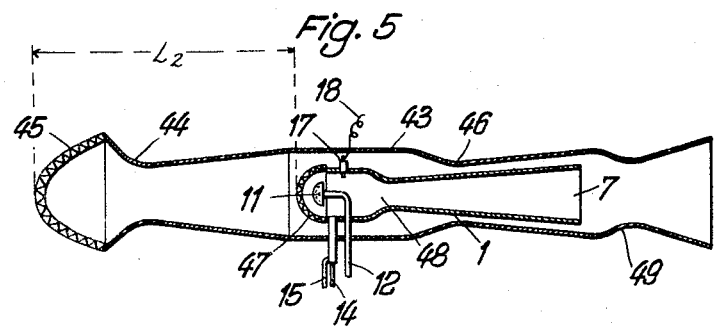
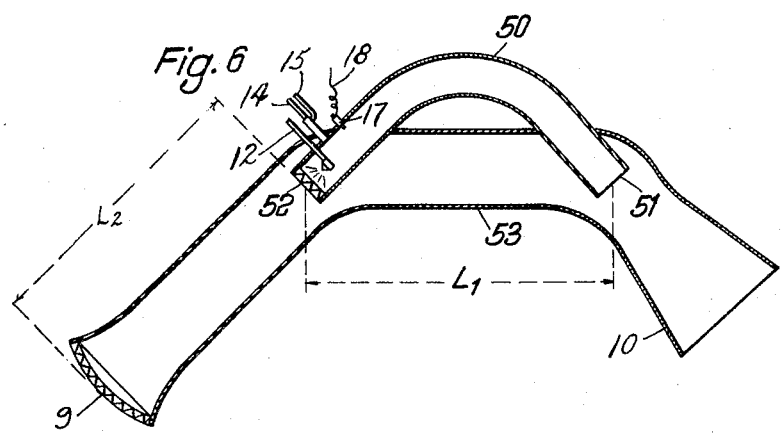
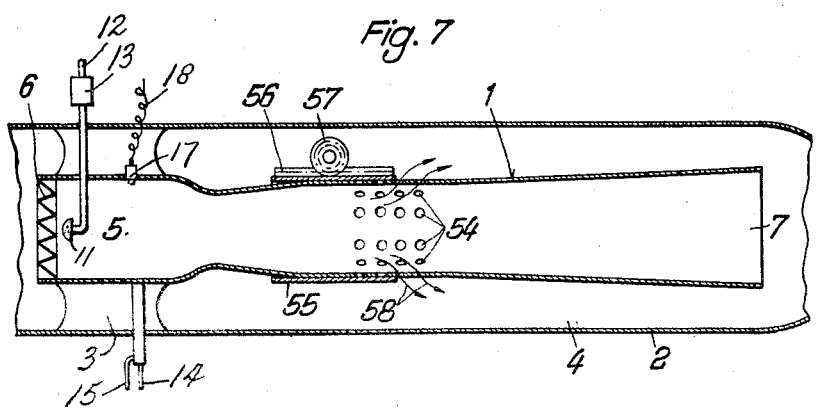

United States Patent Office 2,860,484
Patented Nov. 18, 1958

2,860,484

APPARATUS FOR CAUSING INTERMITTENT COMBUSTION OF A FUEL IN A CHAMBER AS A MEANS OF PRODUCING USEFUL ENERGY

Paul Schmidt, Munich, Germany

Application June 4, 1956, Serial No. 589,199

11 Claims. (Cl. 60—39.77)

The invention relates to a process for the production of useful energy, wherein charges of a gaseous fuel mixture are formed in periodic sequence in a combustion chamber having a controlled inlet and outlet, and are subsequently ignited and burned. The energy of the combustion gases issuing periodically from the outlet of the combustion chamber can be used selectively as pressure or driving energy and/or heat energy.

The invention is also concerned with an improved apparatus for producing useful energy, in which such a process can be used.

In the known processes of this type, at least one of the constituents used for forming the gaseous fuel mixture is a gaseous, elastically compressible medium—preferably air—while the second or, where appropriate, further constituents of the mixture may be solid (e. g. finely ground coal or liquid substances, e. g. finely atomized fuels).

The combustion of the successive fuel mixture charges formed in the combustion chamber is carried out in periodic sequence; in the intervals between the combustion operations, i. e. during the outflow of the combustion gases, there is temporarily only a low pressure present in the combustion chamber, namely in its inlet portion. During these intervals the gaseous medium which is situated outside the combustion chamber in the region of its controlled inlet and which serves to form the ignitable mixture, passes through the combustion chamber inlet, which is constructed for example as a non-return valve, into the combustion chamber where by admixture of the fuel the ignitable gaseous mixture is formed, which will then be ignited appropriately after formation. The burning of such a mixed charge produces in the interior of the combustion chamber a high excess pressure which causes immediate closing of the control member controlling the inlet of the combustion chamber and drives the combustion gases at high speed through the open outlet of the combustion chamber.

The cycle is repeated in periodic sequence, the ignitions of the ignitable mixture charges formed each time in the combustion chamber being initiated in chronological conformity with the generally automatically proceeding operation of charging the combustion chamber.

Ignition may be carried out by electric sparks, by flame remnants from the preceding combustion, or by impulse waves, ignition by impulse waves being preferred, since if the open outlet of the combustion chamber is constructed appropriately, such impulse waves are produced at the said outlet automatically and in a desired chronological dependence on the combustion gases.

Such a process, working with impulse wave ignition, has been explained in detail in my prior American patent application Serial No. 347,274, filed on April 7, 1953, and in the British Patent 747,561; apparatus for carrying the said process into effect were also described and illustrated therein.

In using such processes, it is known to compress the ignitable mixture forming the charges before said mixture is ignited, in order to obtain a better efficiency and higher power. Hitherto this mixture has been compressed either by mechanical means in the interior of the combustion chamber itself, or the gaseous medium forming one constituent of the mixture charges has been introduced under excess pressure into the combustion chamber inlet. Compression of the mixture inside the combustion chamber—e. g. by means of a free piston in the said chamber—necessitates considerable constructional outlay; introduction of the gaseous medium under high pressure requires the provision of the outer compressor device e. g. a rotary compressor.

The general object of the present invention is to improve the known processes of the aforesaid type and to obtain compressed mixture charges in the inlet portion of the combustion chamber without having to use movable mechanical means thereto.

The object of the invention more particularly is to carry out, with simple means, a compression of the gaseous, oxygen-containing medium, e. g. air, which is to be introduced into the controlled inlet of the combustion chamber.

A further object of the invention is only to increase the pressure of the gaseous oxygen-containing medium in the region in front of the combustion chamber at times when a new charge of mixture is to be formed in the combustion chamber in the interval between two combustion operations.

A further object of the invention is to provide an improved apparatus for producing useful mechanical and thermal energy, operating according to the aforesaid process and providing high power and improved efficiency with a simple construction.

A further object of the invention consists in so constructing the novel apparatus that it draws in directly from the environment an oxygen-containing gas e. g. air, which is required for combustion of the fuel, and compresses said gas, without the use of mechanically moved pistons or other compressors, before the combustion chamber inlet and at the instant when, owing to reduction in pressure in the inlet portion of the combustion chamber, the said inlet is opened.

The invention consists first of all in an improved process for the production of useful energy, which differs from the known processes in that pressure waves are produced in a gaseous medium, which is situated in a chamber connecting the combustion chamber inlet and outlet outside the said combustion chamber, by means of the pressure impulses which occur at the outlet of said combustion chamber owing to the periodic combustion operations in the combustion chamber, these pressure waves being so conveyed outside the combustion chamber to the combustion chamber inlet that a temporary excess pressure is produced in the gaseous, oxygen-containing medium in the region of the combustion chamber inlet at the time at which a low pressure is prevailing in the inlet portion of the combustion chamber.

The pressure waves produced at the combustion chamber outlet can either be conveyed directly to the combustion chamber inlet, or it is possible to provide, in the chamber connecting the combustion chamber inlet and outlet, a member which is adapted to reflect the pressure waves arriving at that region, the reflected pressure wave being conveyed to compress the gaseous medium at the combustion chamber inlet.

A particularly powerful compressing effect can be achieved according to the invention in that the time of transit of the pressure wave conveyed direct to the combustion chamber inlet and the time of transit of a wave which has been produced at the time of a preceding combustion operation and is reflected at a wall of the chamber outside the combustion chamber are so adapted to one another and to the period of combustion in the combustion chamber that both the direct and the reflected pressure wave coincide in the region of the combustion chamber inlet at the time when a low pressure is prevailing in the inlet portion of the combustion chamber, and the intensity of the pressure waves is increased by oscillation resonance.

The invention further consists in an apparatus which operates in accordance with the initially mentioned process and wherein the pressure of the gaseous medium forming one constituent of the mixture charges is temporarily increased, before introduction of the medium into the combustion chamber inlet, at the time when a low pressure prevails in the interior of the combustion chamber. The essential feature of the new construction of such an apparatus consists in that a casing is provided which surrounds at least the inlet and outlet of the combustion chamber, bounds a chamber lying outside the combustion chamber and connecting the inlet and outlet thereof, and comprises at its front end an inlet aperture for a gaseous, oxygen-containing medium suitable for forming an ignitable mixture, and the extent of the said casing between the combustion chamber outlet and inlet is so dimensioned that a pressure wave which is produced in the gaseous medium inside the casing by the pressure of the combustion gases flowing out from the combustion chamber outlet, and which travels inside the casing in the direction towards the combustion chamber inlet, arrives at the said inlet at a time when a low pressure prevails in the inlet portion of the combustion chamber.

Further objects and characterizing features of the invention will become apparent from the description and explanation of selected constructional examples, which are illustrated in the accompanying drawings, wherein:

Figure 3 represents the pressure pattern at various points of the apparatus according to Figure 1 which is illustrated in simplified form to the left of Figure 3, the curves of Figure 3 which represent the pressure pattern as a function of time being in each case drawn at the same height at those cross-sections of the apparatus illustrated on the left at which the relevant pressures occur;

Figure 4 shows another constructional form of an apparatus according to the invention which is suitable for stationary installations;

Figure 5 shows a modified constructional form of an apparatus according to the invention, which can be used more particularly as an aircraft jet propulsion unit;

Figure 6 shows a further constructional form of the invention;

Figure 7 is a partial view of one constructional form of the invention which shows means for varying the speed of propagation of the pressure waves in the gas duct connecting combustion chamber outlet and inlet;

Figure 8 is an enlarged longitudinal detailed sectional view of the main fuel supply valve of this invention and its electrical control system.

Figure 1:
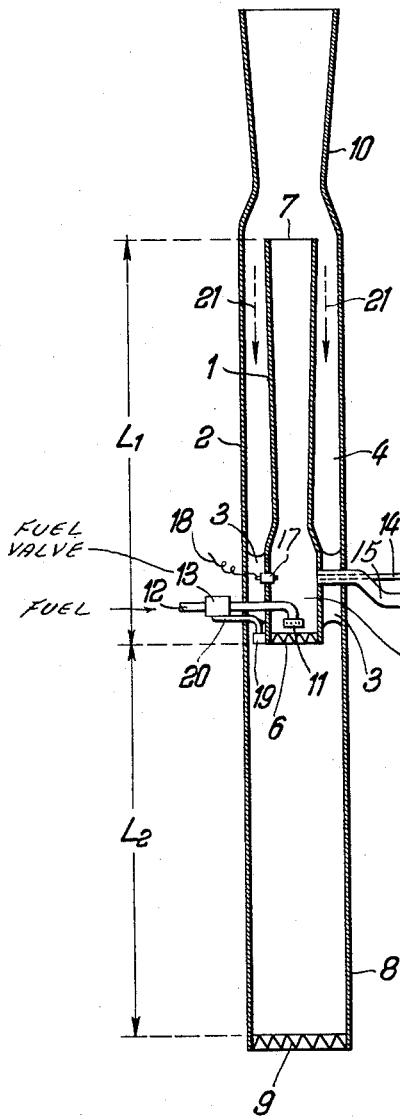
Figure 1 is a diagrammatic axial sectional view of an apparatus constructed according to the invention, for the production of useful energy.

The apparatus according to Figure 1 contains a tubular combustion chamber 1 which is controlled at its inlet and is open at its outlet, and which is so fixed by means of radial ribs 3 in a tubular casing 2 serving as a gas duct that an annular outer chamber 4 is formed between the outer wall surface of the combustion chamber 1 and the casing 2. Situated before the inlet portion 5 of the combustion chamber 1 is a non-return valve 6 which controls the intermittent introduction of the combustion air, while the combustion chamber outlet 7 is open. The outer chamber 4 acts as a gas duct, connecting together the combustion chamber inlet and outlet outside the said combustion chamber. The casing 2, whose front part 8 extends far beyond the inlet end or the combustion chamber 1, comprises at its front end an inlet valve 9 which acts as a non-return valve and takes up the whole inlet cross-section, while the outlet portion 10 of the casing 2, projecting beyond the outlet 7 of the combustion chamber 1, is restricted in the form of a nozzle immediately behind the outlet 7 of the combustion chamber 1, and then widens out gradually towards the open air.

Situated in that inlet portion 5 of the said combustion chamber which adjoins the inlet non-return valve 6 of the combustion chamber 1 is a nozzle head 11 which serves to atomize liquid fuel and to which liquid is fed through the pipe 12 and fuel valve 13 from a fuel reservoir (not shown) whenever air flows into the combustion chamber 1 through the inlet non-return valve 6. A pipe 14 for conveying fuel for starting, terminating in an atomizing nozzle (not shown) serves to introduce starting fuel into the inlet portion 5 of the combustion chamber 1; the starting fuel is mixed with compressed air which is supplied through a pipe 15 which surrounds the end of the starting fuel pipe 14. A double valve 16, which is only used for starting, is used for controlling the supply of starting fuel and compressed air. This valve is operated by a device 161 which may for instance be a press button or remotely controllable electromagnet.

Built into the wall of the inlet portion 5 of the combustion chamber 1 is a spark plug 17, which in known manner is supplied by high-tension igniting current from a high-tension source (not shown) by way of an electric supply line 18, as required for igniting the starting mixture.

A control device 19, which responds upon opening of the inlet non-return valve 6, is connected by way of an operative connection 20, which may be, for instance, an electric circuit, to the fuel valve 13 which is opened when the control device 19 responds, and may be provided with any known time delay switch or relay means for adjusting its duration of opening in each particular case.

Fig. 8 shows an example of the manner of function of the control of the fuel valve 13 by means of the control device 19 and the activating connection 20 formed as an electric activating current circuit. The control device 19 is an electric switching on contact 191 which is built on to the inlet valve 1, acting as a check valve, of the combustion chamber 1. The switching on contact 191 is connected with a valve flap 61, pivotable around the axis 62, of the check valve 6. When the valve flap 61 is opened, the switching on contact 191 is closed. It remains closed as long as the valve flap 61 is open.

The switching on contact 191 lies in the current circuit of a direct current source shown as a battery 201, which delivers current to activate the fuel valve 13 and the ignition device 181.

The fuel valve 13, which is supplied with liquid fuel under excess pressure by means of the fuel supply conduit 12, is a cone valve 131 which is constantly under the influence of a closing spring 132.

The cone valve 131 is firmly connected with the armature 133 of an electromagnet, which can be excited by the magnetic coil 202. On closing the switching on contact 191 the magnetic coil 202 is fed by the current source 201 and keeps the fuel valve 13 open as long as the contact 191 is closed.

The operation of starting the apparatus according to Figure 1 will first be described briefly, in order thereby to facilitate understanding of operations during continuous running.

For starting, compressed air is first of all blown in through the pipe 15 into the inlet portion 5 of the combustion chamber 1; this air is admixed with starting fuel e. g. gasoline, by way of the starting fuel supply pipe 14. After an ignitable gasoline-air mixture has been formed in the inlet portion 5 of the combustion chamber 1, current is applied to the spark plug 17 and the mixture thereby ignited. The combustion of the mixture produces a high pressure in the combustion chamber 1, and said pressure expels the combustion gases formed out of the combustion chamber outlet 7 at a high pressure. The combustion gases issuing at high speed impinge piston-like on air which is present in the nozzle-shaped outlet portion 10 of the casing 2 and exerts a sudden pressure on said air. The combustion gases exert pressure on the air present in the vicinity of the combustion chamber outlet 7 in the outer chamber 4 and produce therein a pressure wave, which travels in the direction of the arrows 21 shown in chain lines outside the combustion chamber 1, to the inlet 6 of the combustion chamber.

The length of the outer chamber 4, i. e. the distance between the combustion chamber outlet 7 and the inlet non-return valve 6 of the combustion chamber 1, which length is designated in Figure 1 as $L_1$, is according to the invention so adapted to the speed of propagation of the pressure wave that the said pressure wave reaches the region of the inlet non-return valve 6 at the instant when the pressure in the inlet portion 5 of the combustion chamber 1 has dropped so far, owing to the suction effect of the combustion gases of preceding combustion as they issue from the combustion chamber, that the pressure-wave increased pressure of the air in front of the inlet non-return valve 6 of the combustion chamber 1 opens the said valve and a charge of compressed air of combustion flows into the inlet portion 5 of the combustion chamber. When this compressed air flows through the inlet non-return valve 6, the control device 19 responds, opens the fuel valve 13 by way of the operative connection 20, and said fuel valve allows a more or less large quantity of fuel, according to the setting of the valve, to pass under high excess pressure into the nozzle head 11, in which the fuel is atomized and mixed with the air which has been introduced.

The ignitable mixture formed in the combustion chamber inlet portion 5 can then either be ignited by the spark plug 17—which can be switched on also, for example, in dependence on pressure in a known manner—or preferably with the help of the impulse wave which is produced at the outlet of the combustion chamber 1 at the time of the sudden pressure drop during the outflow of the combustion gases of the starting charge and travels back with a sharp pressure rise into the combustion chamber 1, and when the impulse wave travels through the fuel mixture it suddenly ignites the latter.

Operations proceed in a periodic sequence, in which, by the repeated ignition and combustion in the inlet portion 5 of the combustion chamber 1, a further pressure jet of combustion gases always issues from the combustion chamber outlet, producing a fresh pressure wave in the outer chamber 4 and a further impulse wave travelling back into the combustion chamber 1 for igniting the next charge introduced into the combustion chamber 1.

During further operation of the apparatus, the pressure waves produced at the outlet of the combustion chamber 1 travel beyond the region of the inlet non-return valve 6 of the combustion chamber 1, and impinge upon the inlet valve 9 which controls the entry of air into the front portion of the casing 2, upon which the said valve closes automatically. The pressure wave is reflected at the closed inlet valve; it then travels back to the inlet non-return valve 6 of the combustion chamber 1. The distance $L_2$, i. e. the distance between the combustion chamber inlet and the reflecting rear face of the inlet valve 9 of the casing 2, is so adapted to the transit time of the pressure wave that the reflected pressure wave arrives before the inlet non-return valve 6 at the instant when a new pressure wave produced at the outlet 7 of the combustion chamber 1 arrives at the said valve 6. The two pressure waves become superposed on one another in this case, and produce a considerable compression of the air present before the inlet non-return valve 6, so that the said air then flows under excess pressure into the inlet portion 5 of the combustion chamber 1 and forms a compressed new mixture charge after admixture of the fuel.

In the case of an apparatus according to the invention, which is constructed for constant running conditions, the lengths $L_1$ and $L_2$ can be previously so arranged that the pressure waves always arrive at the desired time at the inlet non-return valve 6 of the combustion chamber 1. But if the apparatus is to be designed for different operating conditions, more particularly for operating with air supplies of different temperatures or with different fuels, measures must be taken to permit of varying the lengths of the ditsances $L_1$ and $L_2$ in order to adapt the transit times of the pressure waves to the chronological sequence of combustion operations.

Figure 2:
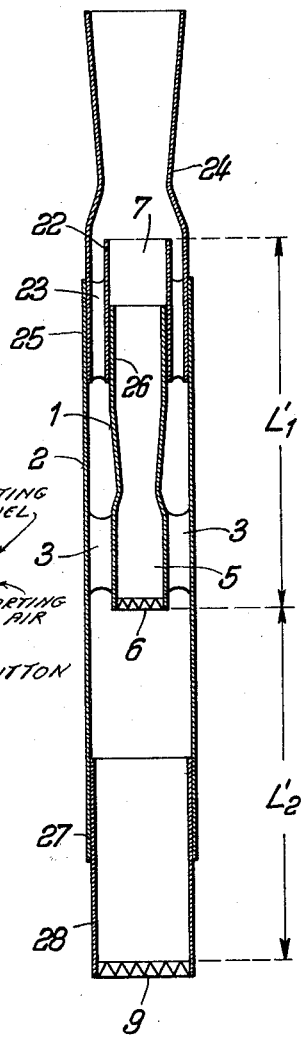
Figure 2 is a simplified view of a constructional form of an apparatus according to Figure 1, showing the possible ways of adjusting the distances over which the pressure waves have to travel.

Figure 2 illustrates diagrammatically one constructional form of the apparatus wherein it is possible to adapt the distances over which pressure waves travel to differing operating conditions. The combustion chamber 1 has an extensible end portion 22 which is connected to the outlet portion 24 of the casing 2 by means of radial ribs 23. The outlet portion 24 is slidably guided in the part 25 of the casing 2, while the end portion 22 of the combustion chamber 1 is guided on the cylindrical part 26 of the combustion chamber. When the portion 24 is pulled outwards, the value $L'_1$ is increased; when the said portion is pushed inwards the said value is correspondingly reduced.

Provided at the inlet portion of the casing 2 is an extensible tubular portion 28, at whose inlet the inlet valve 9 is arranged. This tubular portion 28 slides in the tubular guide 27 of the casing 2.

The length value $L'_2$ can be adjusted as desired by sliding the tubular portion 28.

It will be apparent that with an apparatus according to Figure 2 the lengths $L'_1$ and $L'_2$ can be so adjusted in each case that both the pressure wave coming direct from the outlet 7 of the combustion chamber and also the pressure wave reflected by the inlet valve 9 arrive at the appropriate instant in front of the inlet non-return valve 6 of the combustion chamber 1.

The method of operation of the apparatus illustrated in Figure 1 during continuous running will now be explained, using pressure curves which are measured at combustion tubes and are represented in Figure 3. The various pressures (in kg./cm.$^2$) are plotted in common dependence on time $t$, the horizontal pressure curves representing normal atmospheric pressure being in every case drawn at the same height as that at which appropriate pressure measuring device is situated in the apparatus illustrated at the left of Figure 3. The lowermost pressure curve, designated as $a$, reproduces the variation in pressure immediately behind the air inlet valve 9 of the casing 2. Outside the apparatus normal atmospheric pressure prevails. In the graph situated above, two pressure curves are represented, the curve $b$ illustrates the pressure pattern in the inlet portion 5 of the combustion chamber 1, while the curve $c$ shows the pressure pattern in front of the inlet non-return valve 6 of the combustion chamber 1. The pressure curve $d$ drawn approximately at the height of the combustion chamber outlet 7 shows the pressure at the combustion chamber outlet, while the topmost pressure curve $e$ reproduces the pressure at the outflow aperture of the casing 2. All the pressure curves $a$, $b$, $c$, $d$, $e$ are so plotted that the pressure values valid at the same instant lie vertically one above the other. The curves reproduce an extract from normal running of an apparatus.

The curve $b$ will be seen to contain the steeply rising and then falling combustion pressure 29, which produces the impulse pressure 30 (curve $d$) at the outlet 7 of the combustion chamber. The said impulse pressure in turn results in the production in the outer chamber 4 of the rearwardly travelling pressure wave whose movement is illustrated by the chain-line arrow 31. This pressure wave arrives in front of the inlet non-return valve 6 at the instant in which the pressure (cf. the curve *b*) inside the inlet portion 5 of the combustion chamber 1 has returned to a low value. Simultaneously with this directly produced pressure wave arrives the pressure wave 32 which has been reflected from the inlet valve 9 and stems from a previous combustion, and which moves in the direction of the chain-line arrow 33. Both the said pressure waves arrive simultaneously in front of the inlet non-return valve 6 so that they are added together and deliver the desired high charging pressure. This charging pressure would correspond—with the valve closed—to the chain-line curve piece 34; but since some of the air is forced through the inlet non-return valve 6 into the inlet portion 5 of the combustion chamber, the actual pressure in front of the inlet non-return valve 6 is lower, and corresponds to the part 35 of the pressure curve *c* which is shown in full lines. The pressure waves which are illustrated as arrows 31 and 33 and whose transit times are adapted to the combustion periods in the combustion chamber, travel to and fro in the space which is bounded on the one hand by the inlet valve 9 and on the other hand by the initial part, surrounding the combustion chamber outlet 7, of the outlet portion 10 of the casing 2, said waves receiving a fresh impulse at each combustion by the pressure of the combustion gases at the combustion chamber outlet 7. The intensity of the pressure waves is greatly increased by the resonance which takes place in this arrangement.

The pressure curve *d* at the outlet 7 of the combustion chamber 1 also shows at the same time the production of an igniting impulse wave; its production is defined by the abrupt pressure drop 36 (cf. pressure curve *d*) with the immediately following, very steeply rising pressure jump 37. The impulse wave corresponding to the pressure increase 37 travels through the interior of the combustion chamber 1 in opposition to the rapidly outflowing combustion gases, and impinges on the charge of a new ignitable mixture present in the inlet part 5 of the combustion chamber 1, approximately at the instant when the pressure curve *c* intersects the pressure curve *b*, i. e. when charging is terminated.

Figure 4 shows a constructional form of the invention in which the front chamber 38 of the casing 2 is widened into a cup-shaped curved end piece, in order to obtain the largest possible surface area for the cup-shaped inlet valve 39. The other parts of the apparatus are substantially the same as in the case of Figure 1; they are also designated with the same reference numerals. The fuel nozzles 40 are constructed differently, and are arranged in the form of an annulus immediately on the inner wall of the inlet portion 5 of the combustion chamber, and are fed from an annular conduit 41. The inlet non-return valve 42, which controls inlet into the combustion chamber 1, is mounted in a widened portion of the combustion chamber and terminates—like the inlet valve 39—in a rounded surface. The center of the circle of which the curved surface of the inlet valve 39 forms part lies in the vicinity of the combustion chamber inlet.

This apparatus operates in substantially the same manner as the apparatus according to Figure 1. The advantage consists in that owing to the large surface area of the cup-shaped valve 39, the inlet cross-section for the air aspirated from the atmosphere is very considerable. Therefore only a slight pressure and a small pressure loss occurs at the inside of this valve 39 between the times when the pressure waves are reflected at the inner surface of the inlet valve 39. The distance of the inner surface of the valve 39 from the inlet non-return valve 42 of the combustion chamber 1 is, in this construction also, so chosen that the pressure wave reflected from the inside of the valve 39 coincides in front of the inlet non-return valve 42 with the pressure wave coming direct from the outlet 7 of the combustion chamber 1, and that the pressure increase at this zone always takes place during those times during which a low pressure prevails in the interior of the inlet portion 5 of the combustion chamber 1.

Figure 5 illustrates a jet propulsion unit using the process according to the invention. Those parts which remain substantially unaltered from construction according to Figure 1 have been designated with the same reference numerals. The casing 43 is constructed in a modified form. The front portion 44 of the casing 43 has an inlet valve 45, which is curved in the manner of a paraboloid. At the part 44 the casing 43 is restricted in the manner of a nozzle; it also comprises a nozzle-like restriction at the place indicated as 46.

The constructional form of the apparatus according to the invention illustrated in Figure 5 is particularly suitable as a jet propulsion unit for driving high-speed aircraft. The high inflow speed of the air entering through the inlet valve 45 is retarded in the nozzle-shaped part 44 of the casing 43 to a low speed. The nozzle-like restriction at the part of the casing 43 designated as 46 is intended to increase the speed of the air flowing past the combustion chamber outlet 7.

For treating a relatively large quantity of air, the inlet non-return valve 47 of the combustion chamber 1 is also constructed with a hemispherical cross-section. The inlet cross-section in this valve is thus substantially greater than the narrowest cross-section 48 of the combustion chamber. The advantage of a larger cross-section at the combustion chamber inlet resides in the low pressure drop which is obtained at this valve at the time of charging the combustion chamber.

For promoting more advantageous outflow and to produce very large thrust forces, the nozzle-like construction of the rear portion 49 of the casing 43 is particularly suitable.

Figure 6 shows a diagrammatic view of a modified construction form of the apparatus according to the invention, in which a part of the arcuately constructed combustion chamber 50 situated completely outside the casing 53 connecting the outlet 51 and inlet valve 52 of the combustion chamber. Such a construction should be considered when the absolute temperature of the combustion gases in the interior of the combustion chamber is approximately four times as great as the absolute temperature of the air present in the casing 53. As is known, the speeds of propagation of pressure waves vary substantially in accordance with the square roots of the absolute temperatures. Then since in the case of very high temperatures in the combustion chamber 50, the pressure waves can reach a particularly high speed, in order to time the pressure wave speeds appropriately in the casing 53, the combustion chamber itself must be made substantially longer than that part of the casing 53 which corresponds to the distance $L_1$.

It should be pointed out that it is also possible with the constructional forms according to Figures 4, 5 and 6, to provide regulating means for enabling the distance $L_1$ and $L_2$ for the pressure waves to be adjusted.

One particular manner of regulating the transit time of the pressure waves is illustrated in Figure 7, which merely shows the middle portion—in a simplified form—of an apparatus similar to Figure 1. The combustion chamber 1 is provided approximately in its central portion with numerous apertures 54 which can be closed to a greater or less extent by means of an axially displaceable cylindrical tubular element 55. The cylindrical tubular element is rigidly connected to a rack 56 which can be moved by a toothed wheel 57 operated from the outside. More or fewer apertures 54 can be unmasked by adjusting the cylindrical tubular element 55. Following the combustion operation in the combustion chamber 1, hot combustion gases flow through these apertures 54 into the outer chamber 4 between the combustion chamber 1 and the outer casing 2 (cf. the arrows 58). These hot combustion gases mix with the air in the outer chamber and increase the temperature thereof. The increase in temperature in the outer chamber 4 produces a relatively high speed of propagation for the pressure waves which are produced at the outlet 7, and which then arrive earlier at the inlet non-return valve 6 of the combustion chamber 1.

It will probably be clear that by regulating the free aperture cross-section of all the apertures 54, the temperature of the air (or of the air-gas mixture) in the outer chamber 4 can be varied within wide limits, so that the pressure wave speeds can also be varied substantially. Such a construction of the apparatus according to the invention can also be combined with telescopically extensible tubular elements for the combustion chamber 1 and the casing 2. The operation of the combustion chamber 1 is not impaired by the lateral outflow of a small proportion of the combustion gases from the combustion chamber.

The cross-sections of the inlet valves, which control the inlet into the casing 2 or 43 and into the combustion chamber 1, and also the cross-sections of the casing, are expediently to be so constructed that the quantity of air flowing through the casings is substantially greater than the quantity of air used for combustion. It is particularly expedient to have the quantity of air flowing through the outer chamber 4 more than twice as great as the quantity of air introduced into the combustion chamber.

I claim:

1. Apparatus for the production of useful mechanical and/or thermal energy by intermittent burning of a fuel mixture, comprising: an elongated combustion chamber with controlled inlet and open outlet; means connected to the combustion chamber, for the intermittent formation of a gaseous ignitable mixture in the inlet portion of the combustion chamber, the mixture being formed with the use of a gaseous, oxygen-containing medium e. g. air, which is introduced through the controlled inlet of the combustion chamber into the inlet portion thereof; means controlled in timed dependence on the combustion operations, for the periodic ignition of the fuel mixture formed intermittently in the combustion chamber; a casing which surrounds at least the inlet and outlet of the combustion chamber, which bounds a chamber forming outside the combustion chamber a means of communication between the outlet and inlet of the combustion chamber, and which at its front end comprises an inlet aperture for a gaseous oxygen-containing medium suitable for forming the ignitable mixture, and wherein the length of the said casing between the combustion chamber outlet and combustion chamber inlet is so calculated that a pressure wave, produced in the gaseous medium within the casing by the pressure of the combustion gases flowing out of the combustion chamber outlet, and travelling along in the casing in the direction towards the combustion chamber inlet, arrives at said inlet at an instant when a low pressure prevails in the inlet portion of the combustion chamber.

2. Apparatus for the production of useful mechanical and/or thermal energy by intermittent combustion of a fuel mixture, comprising: an elongated combustion chamber with controlled inlet and open outlet: means connected to the combustion chamber, for the intermittent formation of a gaseous ignitable mixture in the inlet portion of the combustion chamber, the mixture being formed with the use of a gaseous oxygen-containing medium, e. g. air, which is introduced through the controlled inlet of the air combustion chamber into the inlet portion thereof; means controlled in timed dependence on the combustion operations, for the periodic ignition of the fuel mixture formed intermittently in the combustion chamber; a casing which surrounds at least the inlet and outlet of the combustion chamber, which bounds a chamber forming outside the combustion chamber a means of communication between the outlet and inlet of the combustion chamber, and which at its front end comprises an inlet aperture for a gaseous oxygen-containing medium suitable for forming the ignitable mixture, and at its open outlet end comprises an accelerating chamber in which the gaseous medium flowing first past the inlet and then the outlet of the combustion chamber is accelerated by the combustion gases issuing periodically from the combustion chamber outlet and in the front end of the casing a pressure-wave-reflecting member is arranged at such a distance from the inlet of the combustion chamber that an increase in pressure which is produced by the periodic outflow of combustion gases at the outlet of the combustion chamber and which travels at a pressure wave, within in the casing connecting inlet and outlet, as far as the pressure-wave-reflecting member and is thrown back thereby in the direction towards the combustion chamber inlet, comes to be situated in front of the combustion chamber inlet at the instant when a low pressure prevails in the inlet portion of the combustion chamber.

3. Apparatus according to claim 2, characterized in that the length of the communicating chamber, bounded by the casing and situated outside the combustion chamber, between the combustion chamber outlet and combustion chamber inlet, and also the spacing of the pressure-wave-reflecting member from the combustion chamber inlet are so adapted to one another that both a pressure wave coming direct from the combustion chamber outlet and also a pressure wave produced by an earlier combustion and thrown back from the reflecting member come together in the region immediately in front of the combustion chamber inlet at a time when a low pressure prevails in the inlet portion of the combustion chamber.

4. Apparatus according to claim 3, characterized in that the combustion chamber and the casing are constructed to be telescopically extensible for the purpose of varying the length of the distances over which the pressure waves have to travel.

5. Apparatus according to claim 3, characterized by a relatively large number of apertures in the combustion chamber wall, which constitute communication means between the combustion chamber interior and the outer chamber inside the casing, and by an adjustable device which enables all or some of the said apertures to be opened or closed.

6. Apparatus according to claim 3, characterized in that the member for reflecting pressure waves is a valve which controls the inlet aperture for the entry of gaseous oxygen-containing medium into the front portion of the casing.

7. Apparatus according to claim 6, characterized in that the front portion of the casing is widened in conical fashion in the direction todwards the inlet aperture of the casing, and the valve controlling the inlet aperture is cup-shaped.

8. Apparatus according to claim 6, more particularly jet propulsion unit, characterized in that that part of the casing which is situated in front of the combustion chamber inlet is restricted in cross-section in the manner of a nozzle.

9. Apparatus according to claim 8, characterized in that the rear part of the casing in co-axial alignment with the combustion chamber outlet is constructed as a nozzle which is adapted to the number of periods of combustions in the combustion chamber and to the periodic sequence of the pressure waves of the gas columns in the casing.

10. Apparatus according to claim 6, characterized in that the cross-section of the inlet portion of the combustion chamber and the free cross-section of the valve controlling the inlet to the combustion chamber are greater than the cross-section of the combustion chamber which adjoins the inlet portion of the combustion chamber and through which the combustion gases issue.

11. Apparatus according to claim 10 characterized in that the quantity of gaseous medium which flows through the outer chamber between the casing and the combustion chamber, is more than twice as great as the quantity of said medium introduced into the inlet portion of the combustion chamber for forming the ignitable mixture.

References Cited in the file of this patent

UNITED STATES PATENTS

| | | |
|---|---|---|
| 2,543,758 | Bodine | Mar. 6, 1951 |
| 2,750,733 | Paris et al. | June 19, 1956 |

FOREIGN PATENTS

| | | |
|---|---|---|
| 162,195 | Australia | Mar. 25, 1955 |